US012664544B2

(12) United States Patent
Eloul et al.

(10) Patent No.: US 12,664,544 B2
(45) Date of Patent: Jun. 23, 2026

(54) SYSTEMS AND METHODS FOR BLOCKCHAIN-BASED CERTIFIED RANDOM FUNCTION USING QUANTUM RANDOM CIRCUIT GENERATOR

(71) Applicant: JPMORGAN CHASE BANK, N.A., New York, NY (US)

(72) Inventors: Shaltiel Eloul, London (GB); Ruslan Shaydulin, New York, NY (US); Omar Amer, New York, NY (US); Yash Satsangi, Tilburg (NL); Marco Pistoia, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 124 days.

(21) Appl. No.: 18/679,638

(22) Filed: May 31, 2024

(65) Prior Publication Data

US 2026/0037965 A1     Feb. 5, 2026

(51) Int. Cl.
*G06Q 20/38* (2012.01)
*G06F 7/58* (2006.01)

(52) U.S. Cl.
CPC ......... *G06Q 20/3827* (2013.01); *G06F 7/582* (2013.01); *G06Q 2220/00* (2013.01)

(58) Field of Classification Search
CPC ................................................. G06Q 20/3827
See application file for complete search history.

(56) References Cited

U.S. PATENT DOCUMENTS 12,494,909 B1 * 12/2025 Nazarov ................... H04L 9/30

* cited by examiner

*Primary Examiner* — Edward Chang
(74) *Attorney, Agent, or Firm* — GREENBERG TRAURIG LLP

(57) ABSTRACT

A method may include: receiving, by a smart contract, a request for a random number and a randomness seed from a user; deploying the request as a transaction that is written on a first block in the decentralized ledger; generating, by an oracle, a plurality of pseudorandom quantum circuits using the randomness seed; providing the plurality of pseudorandom quantum circuits to a quantum randomness source, wherein the quantum randomness source executes the quantum circuits and returns a sequence of random bits to the oracle; writing the sequence of random bits to a new block in the decentralized ledger; hashing the sequence of random bits and a block hash for the new block; and returning the hash of the sequence of random bits and the block hash to the user computer program, wherein the user consumes hash of the sequence of random bits and the block hash.

20 Claims, 3 Drawing Sheets

SYSTEMS AND METHODS FOR BLOCKCHAIN-BASED CERTIFIED RANDOM FUNCTION USING QUANTUM RANDOM CIRCUIT GENERATOR

BACKGROUND OF THE INVENTION

1. Field of the Invention

Embodiments relate to systems and methods for blockchain-based certified random function using quantum random circuit generator.

2. Description of the Related Art

Randomness plays a part of any process that can be measured or observed. Thus, randomness is often simulated, for example, for analysis, decision making, optimization, encryption, lottery, management of resourcing, gaming, creativity, electronic elections, etc. In Web3, Blockchain, and other decentralized apps (dApps), many of the applications relied on as trusted providers of information are no longer available as a decentralized service.

For example, blockchains and cryptocurrency based on Ethereum dApp or other derived smart contract based blockchains are able to provide services to make decisions in decentralized manner and under consensus protocols. These applications open scalability and diversity for virtual and digital applications.

Applications, such as Web3 games, lottery, elections, and non-fungible tokens, can be performed without a trusted party using well-determined incentive mechanisms and blockchain to sign contracts for automating applications under consensus mechanism, famously with Ethereum virtual environment.

Information that is required to operate services, however, causes a challenge in a fully "no-trust" setup. A subtle but important challenge is to introduce random numbers to a blockchain. This challenge is based on the trustworthiness of random numbers created by users. For example, because miners in blockchain propose new blocks, the miners can manipulate the outcome of a random number by choosing to include or discard the random number proposed in a block (as a transaction), if the random number is created or mixed with using the block hash. Similarly, random numbers generated may be visible ahead of time due to a slow evolving blockchain. Another challenge is based on verifying the source or the random number, and also determining how to trust the source or that the random number had not been tampered with.

SUMMARY OF THE INVENTION

Systems and methods for blockchain-based certified random function using quantum random circuit generator are disclosed. According to an embodiment, a method may include: (1) receiving, by a smart contract executed on a decentralized ledger, a request for a random number and a randomness seed from a user computer program executed by a user electronic device for a user; (2) deploying, by the smart contract, the request as a transaction that may be written on a first block in the decentralized ledger; (3) retrieving, by a first oracle of a plurality of oracles, the request; (4) generating, by the first oracle, a plurality of pseudorandom quantum circuits using the randomness seed; (4) providing, by the first oracle, the plurality of pseudorandom quantum circuits to a quantum randomness source, wherein the quantum randomness source executes the quantum circuits and returns a sequence of random bits to the first oracle; (5) receiving, by the smart contract, the sequence of random bits from the first oracle; (6) writing, by the smart contract, the sequence of random bits to a new block in the decentralized ledger; (7) hashing, by the smart contract, the sequence of random bits and a block hash for the new block; and (8) returning, by the smart contract, the hash of the sequence of random bits and the block hash to the user computer program, wherein the user computer program consumes hash of the sequence of random bits and the block hash.

In one embodiment, the randomness seed may include a value from a pool of entropy, a value from a block hash value on the decentralized ledger, or a value chain, or a value from an operating system of the user electronic device.

In one embodiment, the request may also include an identification of the first oracle.

In one embodiment, each of the plurality of oracles has a reputation and a cost. The reputations may be based on an average time response, a volume of executions, and/or a volume of successful executions.

In one embodiment, the method may also include enforcing, by the smart contract, an authenticity of the sequence of random bits by limiting a time between the first oracle sending the pseudorandom quantum circuits to the quantum randomness source and receipt of the sequence of random bits from the quantum randomness source by the first oracle.

In one embodiment, the method may also include ordering, by the first oracle, a plurality of sequences of random bits, including the sequence of random bits, in the new block until a timestamp associated with mining the new block is received.

In one embodiment, the method may also include rejecting, by the first oracle, the sequences of random bits in response to a threshold rate at which each of the sequences of random bits in the plurality of sequences of random bits is greater than an average block mining time.

In one embodiment, the method may also include requesting, by the smart contract, a randomness certification score from the sequence of random bits; and writing, by the smart contract, the randomness certification score to the new block.

In one embodiment, the method may also include releasing, by the smart contract, payment from the user to the first oracle.

According to another embodiment, a method may include: (1) receiving, by a smart contract executed on a decentralized ledger, a sequence of random bits from an oracle and writing the sequence of random bits to a block on the decentralized ledger, wherein the oracle received the sequence of random bits from a quantum randomness source in response to the quantum randomness source executing a plurality of pseudorandom quantum circuits using a first randomness seed; (2) selecting, by the smart contract, a sub-sample of the plurality of pseudorandom quantum circuits; (3) sending, by the smart contract, the sub-sample of pseudorandom quantum circuits to a compute node network for certification, wherein each node in the compute node network may be configured to compute a randomness certification score for the sequence of random bits using the sub-sample of pseudorandom quantum circuits; (4) receiving, by the smart contract, the randomness certification scores from the plurality of nodes in the compute node network; (5) accepting, by the smart contract, the sequence of random bits based on the randomness certification scores;

and (6) hashing, by the smart contract, the sequence of random bits with a block hash for the block.

In one embodiment, the randomness certification score from each node in the compute node network may be aggregated.

In one embodiment, the sequence of random bits may be accepted in response to the randomness certification scores being over a threshold.

According to another embodiment, a non-transitory computer readable storage medium may include instructions stored thereon, which when read and executed by one or more computer processors, cause the one or more computer processors to perform steps comprising: receiving a request for a random number and a randomness seed from a user computer program executed by a user electronic device for a user; deploying the request as a transaction that may be written on a first block in a decentralized ledger; generating a plurality of pseudorandom quantum circuits using the randomness seed; providing the plurality of pseudorandom quantum circuits to a quantum randomness source; receiving a sequence of random bits from the quantum randomness source; writing the sequence of random bits to a new block in the decentralized ledger; hashing the sequence of random bits and a block hash for the new block; and returning the hash of the sequence of random bits to the user computer program.

In one embodiment, the randomness seed may include a value from a pool of entropy, a value from a block hash value on the decentralized ledger, or a value chain, or a value from an operating system of the user electronic device.

In one embodiment, the non-transitory computer readable storage medium may also include instructions stored thereon, which when read and executed by the one or more computer processors, cause the one or more computer processors to perform steps comprising: enforcing an authenticity of the sequence of random bits by limiting a time between sending the pseudorandom quantum circuits to the quantum randomness source and receipt of the sequences of random bits from the quantum randomness source.

In one embodiment, the non-transitory computer readable storage medium may also include instructions stored thereon, which when read and executed by the one or more computer processors, cause the one or more computer processors to perform steps comprising: ordering a plurality of sequences of random bits including the sequence of random bits in the new block until a timestamp associated with mining the new block is received.

In one embodiment, the non-transitory computer readable storage medium may also include instructions stored thereon, which when read and executed by the one or more computer processors, cause the one or more computer processors to perform steps comprising: selecting a sub-sample of the plurality of pseudorandom quantum circuits; sending the sub-sample of pseudorandom quantum circuits to a compute node network for certification; receiving randomness certification scores from the plurality of nodes in the compute node network; and accepting the sequence of random bits based on the randomness certification scores.

In one embodiment, the sequence of random bits may be accepted in response to the randomness certification scores being over a threshold.

In one embodiment, the randomness certification score from each node in the compute node network may be aggregated.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate to systems and methods for blockchain-based certified random function using quantum random circuit generator.

Embodiments may combine quantum-based entropy random number generators with a verifiable random function (VRF) from an off-chain source on a blockchain. A VRF is a cryptographic function that takes a series of inputs, computes them, and produces a pseudorandom output and a proof of authenticity that can be verified publicly. VRFs are disclosed in Micali et al., "Verifiable random functions," Proceedings of the 40th IEEE Symposium on Foundations of Computer Science. 40th Annual Symposium on Foundations of Computer Science, 120-130 (1999), the disclosure of which is hereby incorporated, by reference, in its entirety.

Examples of VRF systems that utilize computing node for generating random numbers from external computes to blockchain include Chainlink, Harmony VRF, SupraVRF, and Binance VRF.

Embodiments may provide an on-chain VRF-based on hybrid solution of an on-chain smart contract (e.g., a digital contract stored on a blockchain that is automatically executed when predetermined terms and conditions are met) that uses off-chain as providers of VRFs. VRF provider, also called here an "Oracle", may be a computational service or application programming interface (API) that is designed to enhance and extend the capabilities of smart contracts on a decentralized ledger or blockchain (e.g., target chain or main chain) through functions that are not available natively. Because trust in an oracle provider may be reduced when it is used by itself, a consensus model in an oracle network may be used to establish trust. The disclosures of Včelák, Jan, Leonid Reyzin and Sharon Goldberg, "Making NSEC5 Practical for DNSSEC," available at api.semanticscholar.org/CorpusID:251491009 (2017) and Aaronson and Shih-Han Hung, "Certified randomness from quantum supremacy," In Proceedings of the 55th Annual ACM Symposium on Theory of Computing, STOC 2023, page 933-944 (2023) are hereby incorporated, by reference, in their entireties.

Embodiments provide a true random generator over a decentralized system, as well as a fair, non-tempered way to produce random numbers.

Figure 1:
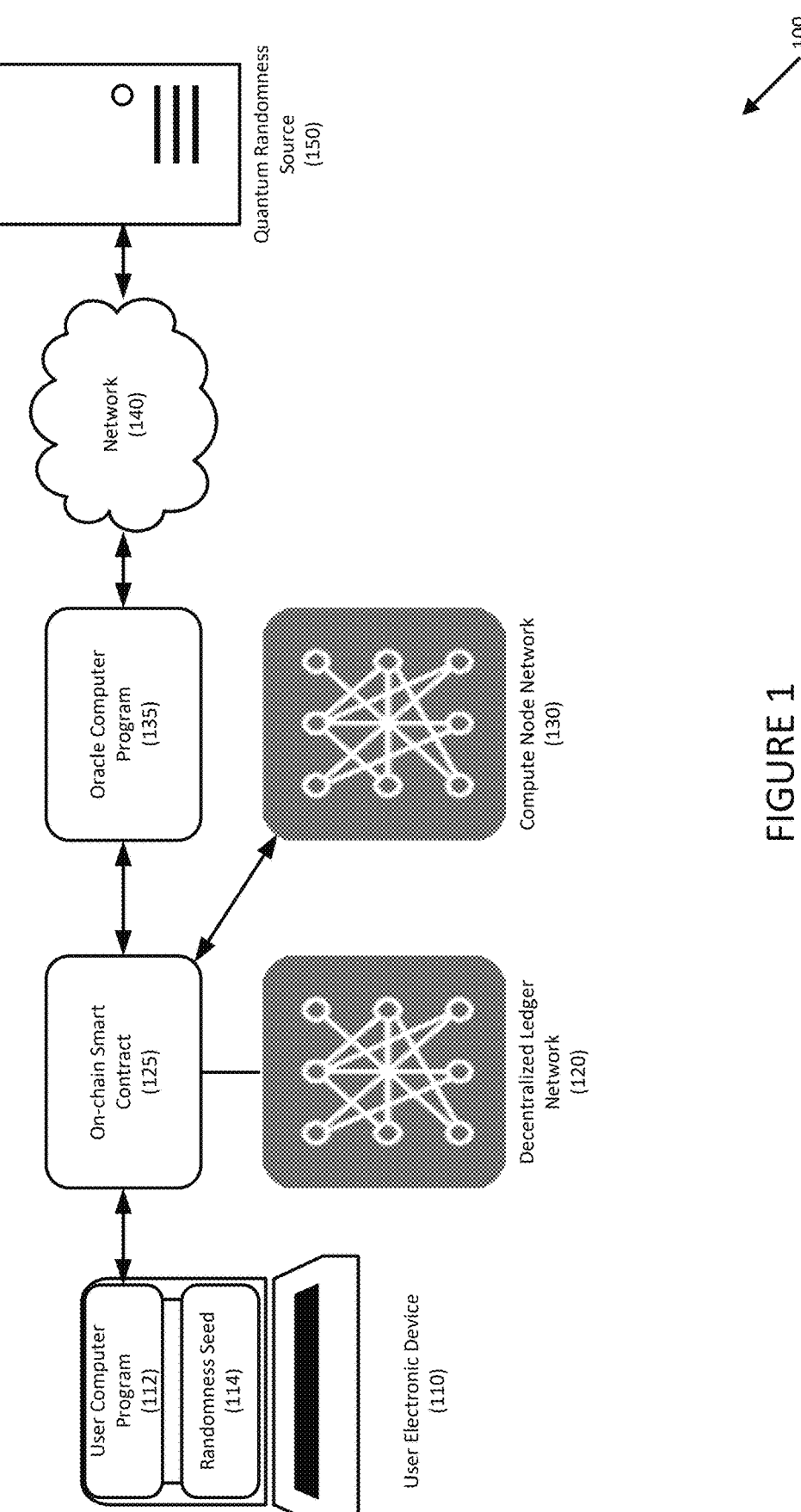
FIG. 1 illustrates a system for blockchain-based certified random function using quantum random circuit generator according to an embodiment.

Referring to FIG. 1, a system for blockchain-based certified random function using quantum random circuit generator is disclosed according to an embodiment. System 100 may include user electronic device 110, which may be a classical computer (e.g., workstation, desktop, laptop, notebook, tablet, etc.), a smart device (e.g., smart phone, smart watch, etc.), an Internet of Things (IOT) device, etc. User electronic device 110 may execute user computer program 112 and may also include randomness seed 114. Randomness seed 114 may be a value from a pool of entropy, such as one that is maintained by user electronic device's operating system or the block hash for a block (e.g., a hash of the contents of the block) in blockchain. Examples of sources of entropy may include CPU jitter, time, pattern of memory access, etc., and the seed may be a value based on one or more of these sources of entropy.

User computer program 112 may interface with decentralized ledger network 120. Decentralized ledger network 120 may execute one or more on-chain smart contracts 125 and decentralized apps (dApps) (not shown). On-chain smart contract 125 may provide certified randomness to user computer program 112.

On-chain smart contract 125 may interface with one of a plurality of oracle computer programs 135, which may be used to request one or more random sequences of bits from quantum randomness source 150 over network 140 (e.g., the Internet). Quantum randomness source 150 may be, for example, a quantum computer.

Examples of interactions between oracle computer program 135 and quantum randomness source 150 are disclosed in U.S. patent application Ser. No. 18/625,605, the disclosure of which is hereby incorporated, by reference, in its entirety.

Each oracle computer program 135 may be associated with a reputation and a cost (e.g., in Ethereum Virtual Machine it can be defined as a gas cost, transaction of coin, or as a new token with asset value mined to the dApp). User computer program 112 may identify a certain oracle computer program 135 when requesting randomness.

Quantum randomness source 150 may be a device that performs quantum computations, such as those based on the collective properties of quantum states including superposition, interference, and entanglement.

On-chain smart contract 125 may also interface with compute node network 130, which may include a plurality of compute nodes. Compute node network 130 may provide certification of randomness of the random sequence(s) of bits received by oracle computer program 135.

Figure 2:
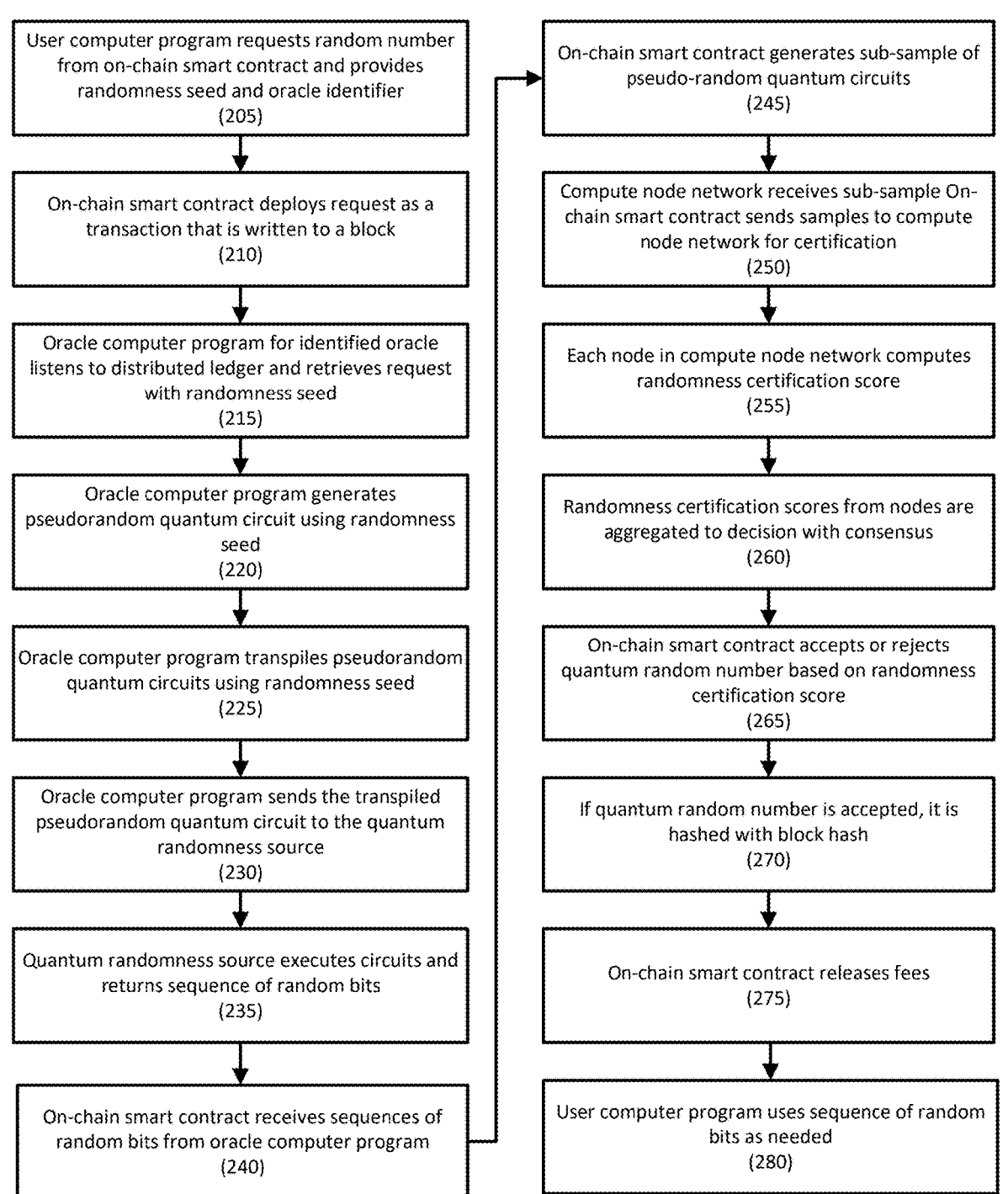
FIG. 2 illustrates a method for blockchain-based certified random function using quantum random circuit generator according to an embodiment.

Referring to FIG. 2, a method for blockchain-based certified random function using quantum random circuit generator is disclosed according to an embodiment.

In step 205, a user computer program executed by a user electronic device may request a random number from an on-chain smart contract on a decentralized ledger, such as a blockchain-based ledger. The user computer program may provide the on-chain smart contract with a randomness seed (e.g., a value from a pool of entropy, or from a block hash value on chain, or one that is maintained by user electronic device's operating system). The user computer program may also identify an oracle to be used when requesting a random sequence of bits. The identification of the oracle may be based on a reputation score for the oracle, a cost of using the oracle, etc.

Oracle addresses and accounts may be associated with statistics on average time response, volume of executions, successful executions, or other information that provides the user with information to make an informed decision on selecting the oracle. The statistics may be provided by a separate platform or as well as a dApp/smart contract on-chain.

Fees may be released automatically using a smart contract upon certification of the random number and meeting the response rate. Fees may be agreed to in advance, upon request, etc. and may be paid in the form of a dedicated asset token.

In step 210, the on-chain smart contract may deploy the request as a transaction that is written on a block in the blockchain.

In step 215, the oracle computer program for the identified oracle may listen to decentralized ledger. When the oracle is identified, the oracle computer program may retrieve the request and the randomness seed from the block using the smart contract.

In step 220, the oracle computer program may generate a pseudorandom quantum circuit using the randomness seed. For example, the oracle computer program may generate a pseudorandom graph having a depth (d) equal to the desired number of layers. In one embodiment, the depth may be specified by the user and may be determined based on the amount of computational power is available to validate the randomness. For example, a greater amount of depth may be used with a supercomputer.

An example of such is disclosed in U.S. patent application Ser. No. 18/625,605, the disclosure of which is hereby incorporated, by reference, in its entirety.

Examples of pseudorandom quantum circuits are described in Weinstein et al., "Parameters of Pseudo-Random Quantum Circuits," available at arXiv:0808.3758 (2008), the disclosure of which is hereby incorporated, by reference, in its entirety In step 225, the oracle computer program may transpile the pseudorandom quantum circuits.

In step 230, the oracle computer program may then send the pseudorandom quantum circuits to a quantum randomness source, such as a quantum computer.

In step 235, the quantum randomness source may execute the pseudorandom quantum circuits and may return sequences of random bits to the oracle computer program.

In step 240, the on-chain smart contract may receive the sequence of random bits from the oracle computer program and may write the sequence(s) of random bits to a new block in the blockchain.

In one embodiment, the authenticity of the sequences of random bits may be enforced by limiting the time between when the pseudorandom quantum circuit is sent to the quantum randomness source and the receipt of the sequences of random bits from the quantum randomness source. For example, the on-chain smart contract may accept the sequences of random bits from the quantum randomness source if they are received within a certain timeframe, or reject them if they are not received within the certain timeframe.

In embodiments, time stamps can only be authenticated by the time stamps for the block. For example, the process of mining block to a decentralized ledger may take a certain amount of time (e.g., 5 seconds). There is also no guarantee that a retrieval from oracle is going to be mined in the next block even if was retrieved in time.

To solve this, the sequences of random bits from the quantum randomness source may be ordered until the oracle retrieves a receipt on the block time stamp, such as the time stamp associated with the mining of the block. By that point, N sequences of random bits may be received, and the rate may be measured to guarantee the authenticity of the sequence of random bits as follows:

$$N/(\text{Block } \#b\_timestamp - \text{Block } \#a\_timestamp) > \text{"threshold rate"}$$

Assuming the threshold rate is much larger average mining time then one block or more is sufficient to obtain effective threshold for the on-chain smart contract to accept or reject the sequences of random bits.

In step 245, the on-chain smart contract may select a sub-sample of the pseudorandom quantum circuits. For example, because it is difficult to validate the sequence of random bits with all of the pseudorandom quantum circuits, a sub-sample of the pseudorandom quantum circuits are used to certify that the sequence of random bits came from the pseudorandom quantum circuits. The number of pseudorandom quantum circuits selected may depend on the certification requirement and allocated resources for certification.

In one embodiment, the sub-sample may be chosen using a second randomness seed, such as a hash of the new block in which the sequence of random bits has been mined. Other ways of obtaining randomness seeds may be used as is necessary and/or desired, but may be generated after the sequence of random bits has been mined to a block.

The compute node network may perform the certification.

In step 250, the compute node network having a plurality of nodes may receive the sequence of random bits and the sub-sample of pseudorandom quantum circuits for certification.

In step 255, each node may compute a randomness certification score for the sub-sample of pseudorandom quantum circuits. Examples of how the randomness certification score may be computed are described in Aaronson et al., "Certified randomness from quantum supremacy," In Proceedings of the 55th Annual ACM Symposium on Theory of Computing, STOC 2023, 933-944 (2023), Mahadev et al. "Efficient Certifiable Randomness from a Single Quantum Device," arXiv:2204.11353 (2022), and Yamakawa et al., "Annual Symposium On Foundations of Computer Science (FOCS)," 69-74, IEEE (2022), the disclosures of each of which are hereby incorporated, by reference, in its entirety. An example of a randomness certification score is the Linear Cross-Entropy Benchmark (LXEB) score.

In step 260, the compute node network may aggregate the randomness certification scores from the nodes for decisioning. In one embodiment, all randomness certification scores from the nodes are deterministic and should be the same, and hence aggregated to a decision with consensus.

In another embodiment, the compute node network may not aggregate the randomness certification scores, but instead may send the randomness certification scores to a smart contract, which may check conditions, such as a randomness certification score threshold, a number of certifying nodes, etc.

In step 265, the on-chain smart contract may accept or reject the sequence of random bits based on the score. The smart contract may provide a threshold of randomness certification scores to accept the random bits and may make them consumable by the user computer program or another computer program or application.

In step 270, the on-chain smart contract may hash the sequence of random bits with the block hash in which the sequence of random bits is written. This may occur when there is a change in a record of transaction in a block of a blockchain, such as by writing a value into the smart contract.

In step 275, the on-chain smart contract may release fees. For example, the oracle may receive fees if the sequence of random bits are accepted. The fees may be based on the fees agreed in the request, such as the fees proposed by the oracle.

The oracle may also receive fees if the sequence of random bits is not certified, but the user may stop the use of this oracle. The nodes in the oracle network may receive fees based on computational resources used and reputation of the network.

The reputation of the oracle may be altered based on whether the random sequences of bits are accepted or rejected, delays in response, no responses, a low randomness certification score, etc. The reputation may be monitored on chain; an additional platform may be provided to aggregate the statistics of oracles.

In step 280, the user computer program may use the sequence of random bits as needed.

The disclosure of U.S. patent application Ser. No. 18/625,633 is hereby incorporated, by reference, in its entirety.

Figure 3:
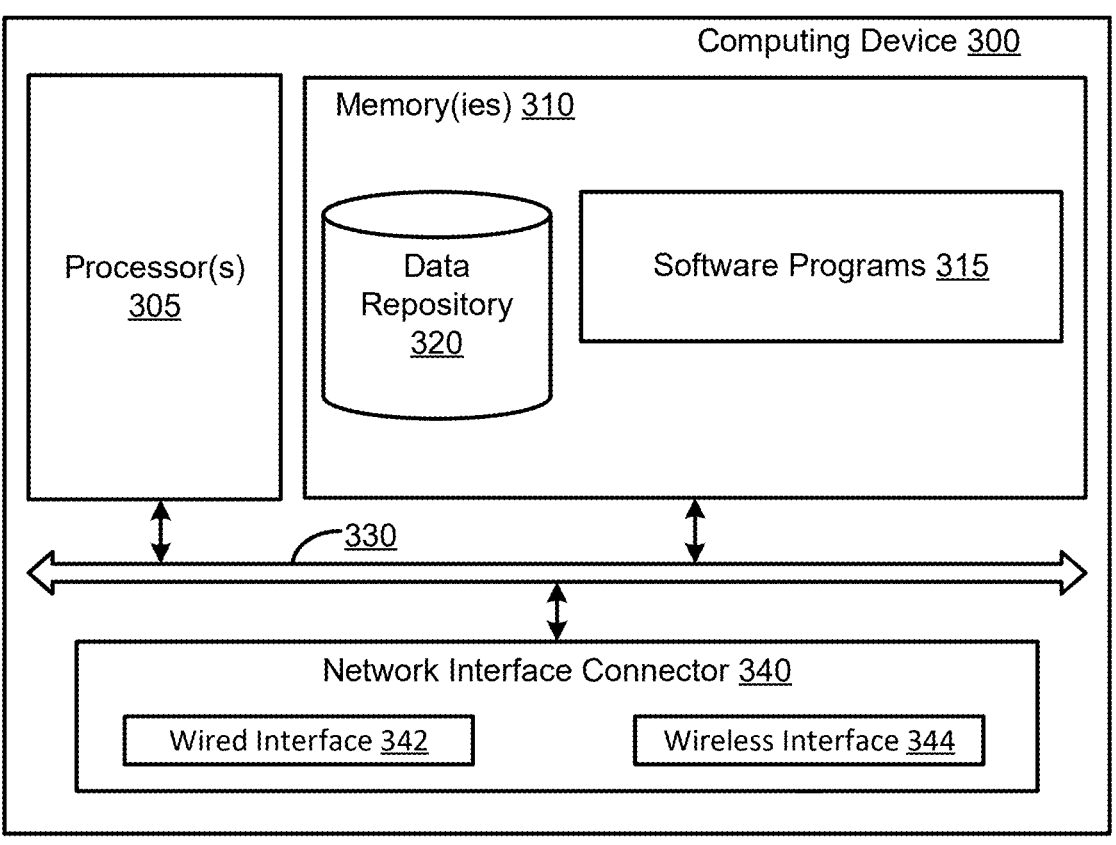
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

The disclosure of U.S. patent application Ser. No. 18/625,633, is hereby incorporated, by reference, in its entirety.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope. Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

receiving, by a smart contract executed on a decentralized ledger, a request for a random number and a randomness seed from a user computer program executed by a user electronic device for a user;

deploying, by the smart contract, the request as a transaction that is written on a first block in the decentralized ledger;

retrieving, by a first oracle of a plurality of oracles, the request;

generating, by the first oracle, a plurality of pseudorandom quantum circuits using the randomness seed;

providing, by the first oracle, the plurality of pseudorandom quantum circuits to a quantum randomness source, wherein the quantum randomness source executes the quantum circuits and returns a sequence of random bits to the first oracle;

receiving, by the smart contract, the sequence of random bits from the first oracle;

writing, by the smart contract, the sequence of random bits to a new block in the decentralized ledger;

hashing, by the smart contract, the sequence of random bits and a block hash for the new block; and returning, by the smart contract, the hash of the sequence of random bits and the block hash to the user computer program, wherein the user computer program consumes hash of the sequence of random bits and the block hash.

2. The method of claim 1, wherein the randomness seed comprises a value from a pool of entropy, a value from a block hash value on the decentralized ledger, or a value chain, or a value from an operating system of the user electronic device.

3. The method of claim 1, wherein the request further comprises an identification of the first oracle.

4. The method of claim 1, wherein each of the plurality of oracles has a reputation and a cost.

5. The method of claim 4, wherein the reputations are based on an average time response, a volume of executions, and/or a volume of successful executions.

6. The method of claim 1, further comprising:

enforcing, by the smart contract, an authenticity of the sequence of random bits by limiting a time between the first oracle sending the pseudorandom quantum circuits to the quantum randomness source and receipt of the sequence of random bits from the quantum randomness source by the first oracle.

7. The method of claim 1, further comprising:

ordering, by the first oracle, a plurality of sequences of random bits, including the sequence of random bits, in the new block until a timestamp associated with mining the new block is received.

8. The method of claim 7, further comprising:

rejecting, by the first oracle, the sequences of random bits in response to a threshold rate at which each of the sequences of random bits in the plurality of sequences of random bits is greater than an average block mining time.

9. The method of claim 1, further comprising:

requesting, by the smart contract, a randomness certification score from the sequence of random bits; and writing, by the smart contract, the randomness certification score to the new block.

10. The method of claim 1, further comprising:

releasing, by the smart contract, payment from the user to the first oracle.

11. A method, comprising:

receiving, by a smart contract executed on a decentralized ledger, a sequence of random bits from an oracle and writing the sequence of random bits to a block on the decentralized ledger, wherein the oracle received the sequence of random bits from a quantum randomness source in response to the quantum randomness source executing a plurality of pseudorandom quantum circuits using a first randomness seed;

selecting, by the smart contract, a sub-sample of the plurality of pseudorandom quantum circuits;

sending, by the smart contract, the sub-sample of pseudorandom quantum circuits to a compute node network for certification, wherein each node in the compute node network is configured to compute a randomness certification score for the sequence of random bits using the sub-sample of pseudorandom quantum circuits;

receiving, by the smart contract, the randomness certification scores from the plurality of nodes in the compute node network;

accepting, by the smart contract, the sequence of random bits based on the randomness certification scores; and hashing, by the smart contract, the sequence of random bits with a block hash for the block.

12. The method of claim 11, wherein the randomness certification score from each node in the compute node network are aggregated.

13. The method of claim 11, wherein the sequence of random bits is accepted in response to the randomness certification scores being over a threshold.

14. A non-transitory computer readable storage medium, including instructions stored thereon, which when read and executed by one or more computer processors, cause the one or more computer processors to perform steps comprising:

receiving a request for a random number and a randomness seed from a user computer program executed by a user electronic device for a user;

deploying the request as a transaction that is written on a first block in a decentralized ledger;

generating a plurality of pseudorandom quantum circuits using the randomness seed;

providing the plurality of pseudorandom quantum circuits to a quantum randomness source;

receiving a sequence of random bits from the quantum randomness source;

writing the sequence of random bits to a new block in the decentralized ledger;

hashing the sequence of random bits and a block hash for the new block;

and returning the hash of the sequence of random bits to the user computer program.

15. The non-transitory computer readable storage medium of claim 14, wherein the randomness seed comprises a value from a pool of entropy, a value from a block hash value on the decentralized ledger, or a value chain, or a value from an operating system of the user electronic device.

16. The non-transitory computer readable storage medium of claim 14, further including instructions stored thereon, which when read and executed by the one or more computer processors, cause the one or more computer processors to perform steps comprising:

enforcing an authenticity of the sequence of random bits by limiting a time between sending the pseudorandom quantum circuits to the quantum randomness source and receipt of the sequences of random bits from the quantum randomness source.

17. The non-transitory computer readable storage medium of claim 14, further including instructions stored thereon, which when read and executed by the one or more computer processors, cause the one or more computer processors to perform steps comprising:

ordering a plurality of sequences of random bits including the sequence of random bits in the new block until a timestamp associated with mining the new block is received.

18. The non-transitory computer readable storage medium of claim 14, further including instructions stored thereon, which when read and executed by the one or more computer processors, cause the one or more computer processors to perform steps comprising:

selecting a sub-sample of the plurality of pseudorandom quantum circuits;

sending the sub-sample of pseudorandom quantum circuits to a compute node network for certification;

receiving randomness certification scores from the plurality of nodes in the compute node network; and accepting the sequence of random bits based on the randomness certification scores.

19. The non-transitory computer readable storage medium of claim 18, wherein the sequence of random bits is accepted in response to the randomness certification scores being over a threshold.

20. The non-transitory computer readable storage medium of claim 18, wherein the randomness certification score from each node in the compute node network are aggregated.

* * * * *